United States Patent [19]

Furuya et al.

[11] Patent Number: 4,748,095
[45] Date of Patent: May 31, 1988

[54] HALOGEN CELL

[75] Inventors: Nagakazu Furuya, No. 4-3-31, Ohte 2-chome; Satoshi Motoo, No. 5-24, Takeda 3-chome, both of Kofu-shi, Yamanashi, Japan

[73] Assignees: Nagakazu Furuya; Satoshi Motoo; Tanaka Kikinzoku Kogyo K.K., all of Japan

[21] Appl. No.: 22,866

[22] Filed: Mar. 6, 1987

[51] Int. Cl.[4] ............................................. H01M 4/86
[52] U.S. Cl. .................................... 429/101; 429/105; 429/42
[58] Field of Search ................... 429/101, 105, 27, 42, 429/40, 13, 17

[56] References Cited

U.S. PATENT DOCUMENTS

| | | | |
|---|---|---|---|
| 3,806,368 | 4/1974 | Maricle et al. | 429/101 |
| 3,813,301 | 5/1974 | Carr | 429/105 X |
| 4,105,829 | 8/1978 | Venero | 429/101 X |
| 4,113,924 | 9/1978 | Kantner | 429/101 X |
| 4,293,396 | 10/1981 | Allen et al. | 429/27 X |

Primary Examiner—Anthony Skapars
Attorney, Agent, or Firm—Stefan J. Klauber

[57] ABSTRACT

Disclosed herein is a halogen cell of which a positive electrode and/or a negative electrode is a gas permeable electrode. The gas permeable electrode preferably comprises a hydrophilic layer and a gas permeable layer. Since, in this halogen cell, the decrease of the electrode surface area can be prevented, and the desired gas can be rapidly supplied to the electrode, the quantity of charge is increased and the charging time is reduced.

Also disclosed herein is a halogen cell of which a positive electrode and/or negative electrode comprises finely divided hydrophilic portions and hydrophobic portions. In this halogen cell, the quantity of charge and the charging time are also improved.

4 Claims, 1 Drawing Sheet

HALOGEN CELL

BACKGROUND OF THE INVENTION

This invention relates to a halogen cell, especially to a halogen cell for power storage, electric automobiles and the like.

A positive electrode of a conventional halogen cell may be a porous one comprising carbon felt supported with such a precious metal as palladium. In this halogen cell, halogen gas generated is adsorbed on the positive electrode surface. Since, accordingly, the adsorbed gas substantially decreases the surface area of the positive electrode, the flowing current decreases and a longer charging time is required. Although, at present, electrolyte is forced to permeate the felt-like positive electrode by means of a pump to decrease the volume of the halogen gas adsorbed, it is not satisfactory. At the time of discharge, the quantity of current taken out per unit surface area of the positive electrode is small because the rapid supply of halogen gas dissolved in the electrolyte to the positive electrode surface according to the quantity of discharge is difficult.

On the other hand, a carbon plate may be employed as a negative electrode of a conventional halogen cell. In this halogen cell, hydrogen gas generated is adsorbed on the negative electrode surface at the beginning of discharge. Since, accordingly, the adsorbed gas prevents precipitation of metals and lowers the depositability of the precipitated metals, the quantity of current is limited so as to require a longer charging time. Further, the precipitated metal is liable to be peeled off and a sufficient quantity of charge cannot be obtained.

SUMMARY OF THE INVENTION

An object of the present invention is to provide a halogen cell having a positive electrode which can rapidly remove halogen gas generated thereon at the time of charge and can quickly supply halogen gas thereto according to the quantity of discharge at the time of discharge.

Another object of the present invention is to provide a halogen cell in which halogen gas generated on a positive electrode at the time of charge leaves upwardly without adsorption, and halogen gas supplied at the time of discharge permeates hydrophobic portions of the positive electrode to adequately react with the electrolyte in the hydrophilic portions.

A further object of the present invention is to provide a halogen cell having an negative electrode which can quickly absorb hydrogen gas generated thereon and the hydrogen gas permeates the negative electrode to be removed.

A halogen cell according to the present invention is characterized in that a positive electrode and/or a negative electrode comprises a gas permeable electrode. The gas permeable electrode may comprise a hydrophilic layer and a gas permeable layer attached to each other. The hydrophilic layer may comprise a platinum group metal and/or its oxides, hydrophilic carbon blacks and polytetrafluoroethylene (hereinafter referred to as PTFE) powders, and the gas permeable layer may comprise the mixture of hydrophobic carbon blacks and PTFE powders.

In another aspect of the present invention, a positive electrode and/or a negative electrode comprises finely divided hydrophilic portions and hydrophobic portions. The hydrophilic portions may comprise hydrophilic carbon blacks, and the hydrophobic portions may comprise hydrophobic carbon blacks and PTFE powders. The hydrophilic carbon blacks in the hydrophilic portions may be replaced with such an conductive material as activated carbon, metals or oxides.

In the halogen cell of which the positive electrode comprises the gas permeable electrode, halogen gas generated in the hydrophilic layer of the positive electrode at the time of charge is rapidly absorbed and permeates the positive electrode so as not to decrease the reaction area of the positive electrode, and on the other hand halogen gas can be rapidly supplied from the gas permeable layer to the hydrophilic layer of the positive electrode at the time of charge. Accordingly, the quantity of current per unit area of the positive electrode is increased so that a charge can be carried out in a short time and a large quantity of current can be taken out.

In the halogen cell of which the negative electrode comprises the gas permeable electrode, hydrogen gas generated in the hydrophilic layer of the positive electrode at the beginning of charge is rapidly absorbed and permeates the gas permeable layer so as not to prevent the precipitation of metals to the negative electrode and to increase the depositability of metals. Accordingly, the quantity of current per unit area of the negative electrode is increased so that a charge can be carried out in a short time, and the quantity of charge can be sufficiently increased because the precipitated metals are not peeled off.

In the halogen cell of which the positive electrode comprises the finely divided hydrophilic portions and the hydrophobic portions, halogen gas generated in the hydrophilic portions of the positive electrode at the time of charge permeates the hydrophobic portions to leave upwardly without adsorption in the form of bubbles, and on the other hand halogen gas supplied in the electrolyte at the time of discharge permeates the hydrophobic portions to adequately react with the electrolyte in the hydrophilic portions. Since, accordingly, the reaction area between the halogen gas and the electrolyte in the positive electrode is large and a large quantity of current can flow, the efficiency of charge and discharge is remarkably high so that a charge can be carried out in a short time and a large quantity of current can be taken out.

In the halogen cell of which the negative electrode comprises the finely divided hydrophilic portions and the hydrophobic portions, hydrogen gas generated in the hydrophilic portions of the negative electrode at the beginning of charge is absorbed in and permeates the hydrophobic portions so as not to prevent the precipitation of metals to the negative electrode and to increase the depositability of the metals. Accordingly, the quantity of current per unit area of the negative electrode is increased so that a charge can be carried out in a short time, and the quantity of charge can be sufficiently increased because the precipitated metals are not peeled off.

Since the power producing capacity of the halogen cell of this invention is strikingly advanced, the said halogen cell is an epoch-making one which can be replaced with a conventional one.

DETAILED DESCRIPTION OF THE INVENTION

Figure 1:
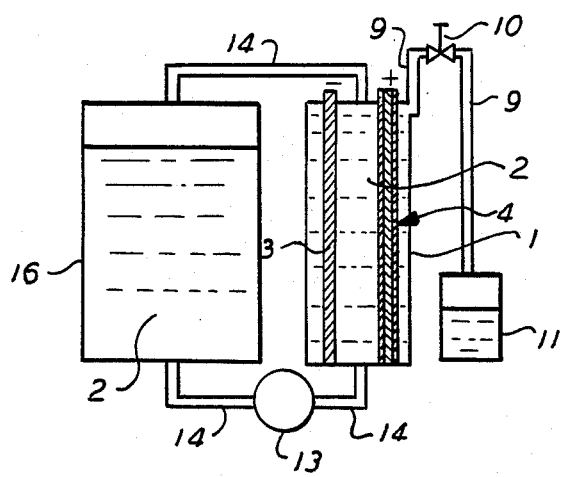
FIG. 1 is a schematic vertical section of a first embodiment of a halogen cell according to the present invention.

Referring now to the drawings, there are shown exemplary embodiments of a halogen cell according to the present invention.

Figure 2:
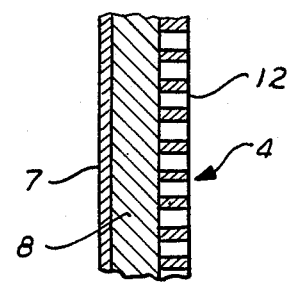
FIG. 2 is an enlarged vertical section of a gas permeable electrode of the halogen cell of FIG. 1.

An electrolyte bath 1 shown in FIG. 1 is filled with an aqueous solution 2 of $ZnCl_2$, KCl and NaCl. In this aqueous solution 2 are provided an negative electrode 3 composed of carbon, and a gas permeable electrode 4 serving as a positive electrode. The gas permeable electrode 4 comprises a hydrophilic layer 7 comprising hydrophilic portions and hydrophobic portions, and a gas permeable layer 8 attached to each other, and a porous collecting plate 12 attached thereto as shown in FIG. 2. The hydrophilic layer 7 having a thickness of 0.1 mm, a width of 100 mm and a length of 100 mm comprises $RuO_2$ powders having a mean particle size of 150 Å, hydrophobic carbon blacks having a mean particle size of 420 Å and PTFE powders having a mean particle size of $0.3\mu$ mixed and molded in the proportion of 4:5:3. The gas permeable layer 8 having a thickness of 0.5 mm comprises hydrophobic carbon powders having a mean particle size of 450 Å and PTFE powders having a mean particle size of $0.3\mu$ mixed and molded in the proportion of 7:3. One end of a gas passage 9 is equipped with a valve 10 and is connected to the electrolyte bath 1, and the other end of which is connected to a gas reservoir 11. The numerals 13, 14 and 16 in FIG. 1 designate a pump, an eletrolyte circulating passage and an electolyte reserving tank, respectively.

In the above halogen cell, the aqueous solution 2 of $ZnCl_2$, KCl and NaCl permeates the hydrophilic layer 7 of the gas permeable electrode 4, and $Cl_2$ gas generated therein upon the reaction is absorbed into and permeates the gas permeable layer 8 without delay. The $Cl_2$ gas having permeated the gas permeable layer 8 is released, through the gas passage 9 with the valve 10 opened, to cold water in the gas reservoir 11 to be stored therein as chlorine hydrate. On the other hand, Zn is precipitated on the surface of the negative electrode 3 to gradually dilute the Zn concentration of the aqueous solution 2 of $ZnCl_2$, KCl and NaCl to result in an aqueous solution of a lower concentration $ZnCl_2$ at the completion of charge.

As a result of a large volume of the $Cl_2$ gas generated by the active catalytic reaction on the hydrophilic layer 7 of the gas permeable electrode 4, the quantity of charge per unit time is over ten times higher than that of a conventional halogen cell employing a porous positive electrode comprising carbon felt supported with palladium, and the charging time is less than one-tenth shorter than that of the above conventional halogen cell.

At the time of discharge the chlorine hydrate in the reservoir 11 is thermally decomposed to generate $Cl_2$ gas which permeates the gas permeable electrode 4 from the gas permeable layer 8 side. The $Cl_2$ gas is then by the electrode reaction converted into 2 Cl— which is supplied into the electrolyte bath 1. On the other hand, the Zn on the anode 3 is converted into $Zn^{2+}$ which dissolves into the aqueous solution 2 of the low concentration $ZnCl_2$ in the electrolyte bath 1 to increase the $ZnCl_2$ concentration. Since, at the time of this discharge, a large volume of the $Cl_2$ gas in the hydrophilic layer 7 of the gas permeable electrode 4 is by the electrode reaction converted into 2 Cl— which is dissolved into the aqueous solution 2 permeating the hydrophilic layer 7, the quantity of discharge is considerably high.

Although $RuO_2$ is employed as a catalyst in the hydrophilic layer 7 of the gas permeable electrode 4 in this embodiment, the catalyst is not limited thereto, and any of the platinum group metals and/or their oxides may be employed.

The electrolyte in this embodiment is the $ZnCl_2$ aqueous solution, but a $CdCl_2$ aqueous solution or a $ZnBr_2$ aqueous solution may be employed. In the case of a $ZnBr_2$ aqueous solution, the solution is heated to not less than 60° C. in order to gasify 2 Br— at the time of charge.

Any one of the electrodes which produce less $H_2$ gas (such as carbon electrode, gas permeable electrode with no platinum metals and/or their oxides and the like) may be employed as the negative electrode. The surface of the negative electrode is preferably rough because Zn or Cd is peeled off from a smooth surface.

Figure 3:
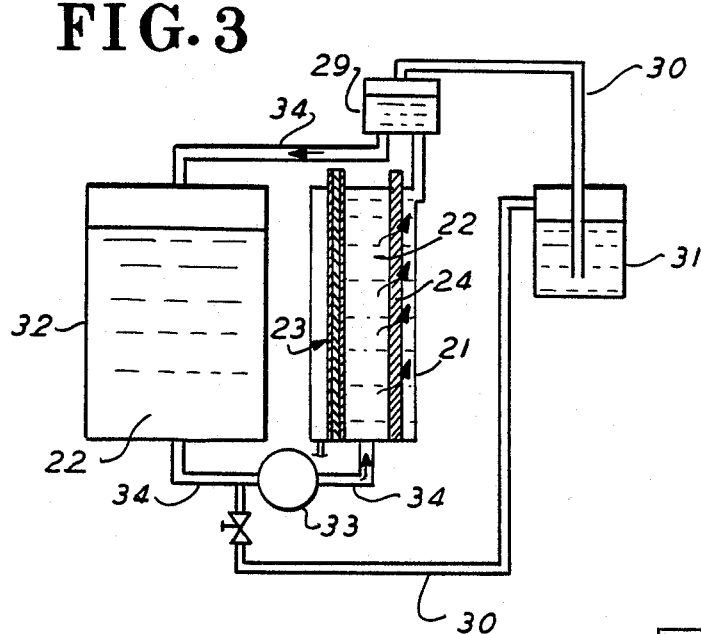
FIG. 3 is a schematic vertical section of a second embodiment of a halogen cell according to the present invention.
Figure 4:
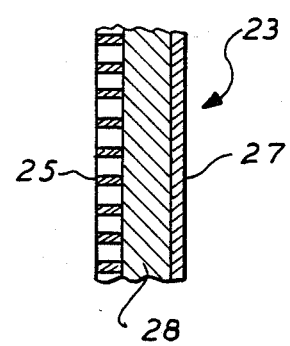
FIG. 4 is an enlarged vertical section of a gas permeable electrode of the halogen cell of FIG. 3.

An electrolyte bath 21 of FIG. 3 is filled with an aqueous solution 22 of $ZnCl_2$, KCl and NaCl. In this aqueous solution 22 are provided a gas permeable electrode 23 serving as negative electrode, and a positive electrode 24 composed of carbon felt supported with a platinum group metal. The gas permeable electrode 23 comprises a hydrophilic layer 27 and a gas permeable layer 28 attached to each other, and a porous collecting plate 25 attached thereto as shown in FIG. 4. The hydrophilic layer 27 comprises hydrophilic portions and hydrophobic portions formed by mixing and molding hydrophilic carbon blacks and PTFE powders in the proportion of 7:3. The hydrophobic gas permeable layer 28 comprises hydrophobic carbon blacks and PTFE powders in the proportion of 7:3. The numerals 29, 30, 31, 32, 33 and 34 in FIG. 3 designate a gas-liquid separating tank, a halogen gas passage, a gas reservoir, an electrolyte reserving tank, a pump and an electrolyte circulating passage, respectively.

In the above halogen cell, the aqueous solution 22 of $ZnCl_2$, KCl and NaCl permeates the hydrophilic portions of the hydrophilic layer 27 of the gas permeable electrode 23, and $H_2$ gas generated therein upon the reaction is absorbed into the hydrophobic portions of the hydrophilic layer 27 without delay and permeates the gas permeable layer 28 to be released outside. Zn is precipitated on the surface of the negative electrode 23 to gradually dilute the Zn concentration of the aqueous solution 22 of $ZnCl_2$, KCl and NaCl to result in the aqueous solution of a lower concentration $ZnCl_2$ at the completion of charge.

Since the $H_2$ gas generated in the hydrophilic layer 27 of the gas permeable electrode 23 described as the above is rapidly absorbed into and permeates the gas permeable layer 28 so as not to prevent the precipitation of the metals, the quantity of charge per unit time is five times higher than that of a conventional halogen cell employing a carbon plate as a negative electrode and the charging time is one-fifth shorter than that of the above conventional halogen cell.

As described in the first embodiment, a $CdCl_2$ aqueous solution or a $ZnBr_2$ aqueous solution may be employed other than the $ZnCl_2$ aqueous solution. A gas permeable electrode may be employed as a positive electrode in place of the carbon-felt electrode.

Figure 5:
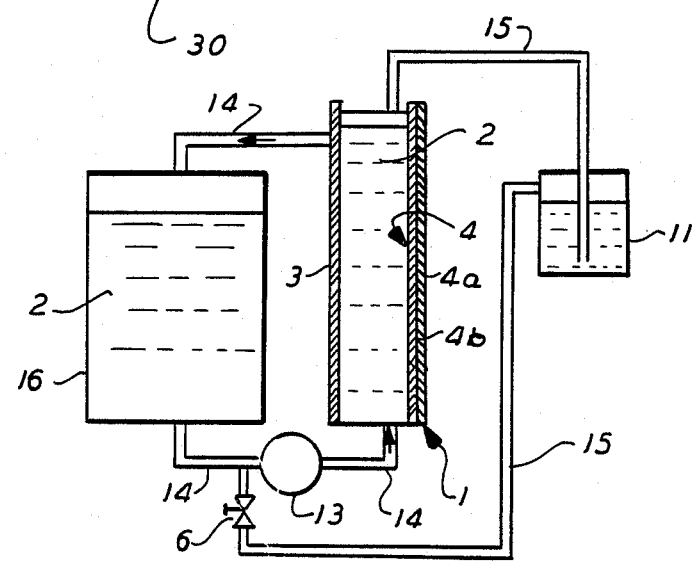
FIG. 5 is a schematic vertical section of a third embodiment of a halogen cell according to the present invention.

FIG. 5 shows a third embodiment of a halogen cell according to the present invention. This embodiment is a modification of the first embodiment and like reference numerals in FIG. 5 denote like parts in FIGS. 1 and 2.

An electrolyte bath 1 of FIG. 5 is filled with an aqueous solution 2 of $ZnCl_2$. In this aqueous solution 2 are provided an negative electrode 3 composed of carbon felt and a positive electrode 4 comprising finely divided and dispersed hyddrophilic portions and hydrophobic portions. The positive electrode 4 comprises a composite plate comprising a plate 4a and a collecting plate 4b attached to each other. The plate 4a having a thickness of 0.1 mm, a width of 100 mm and a length of 100 mm comprises hydrophilic carbon blacks having a mean particle size of 420 Å, hydrophobic carbon blacks having a mean particle size of 450 Å and PTFE powders having a mean particle size of $0.3\mu$ mixed and molded in the proportion of 4:3:3. In FIG. 5, a gas passage 15, one end of which is connected to the eletrolyte bath 1, is connected to a circulation pipe 14 of the electrolyte 2 through a gas reservoir 11. Further, an electrolyte reserving tank 12 and a pump 13 are connected to each other by the pipe 14.

In this halogen cell, similar to the first embodiment, the quantity of charge per unit time is over ten times higher than that of a conventional halogen cell employing a porous positive electrode comprising graphite, and the charging time is less than one-tenth shorter than that of the above conventional halogen cell.

Similar to the third embodiment, a negative electrode may comprise finely divided and dispersed hydrophilic portions and hydrophobic portions. By employing this negative electrode, the quantity of charge per unit time can be five times higher than that of a conventional halogen cell employing a carbon plate as a negative electrode, and the time of charge can be one-fifth shorter than that of the above conventional halogen cell.

To the above negative electrode may be attached a gas permeable layer or a non-permeable layer. The halogen cell is not limited to that of a single layer, but may be a biopolar type of multi-layers.

What is claimed is:

1. A halogen cell comprising at least one gas-permeable electrode, wherein the gas permeable electrode comprises a hydrophilic layer and a gas permeable layer attached to each other.

2. In a halogen cell as claimed in claim 1, wherein the hydrophilic layer comprises a platinum group metal and/or its oxides, hydrophilic carbon blacks and polytetrafluoroethylene powders, and the gas permeable layer comprises hydrophobic carbon blacks and polytetrafluoroethylene powders.

3. A halogen cell having at least one electrode comprising finely divided hydrophilic portions and hydrophobic portions.

4. In a halogen cell as claimed in claim 3, wherein the hydrophilic portions comprise hydrophilic carbon blacks, and the hydrophobic portions comprise hydrophobic carbon blacks and polytetrafluoroethylene powders.

* * * * *